(12) United States Patent  (10) Patent No.: US 7,985,141 B2
Spensberger  (45) Date of Patent: Jul. 26, 2011

(54) UNIVERSAL DOUBLE-JOINTED COUPLING FOR RAILWAY VEHICLES

(75) Inventor: Christoph Spensberger, Dippoldiswalde OT Paulsdorf (DE)

(73) Assignee: KWD Kupplungswerk Dresden GmbH, Dresden (DE)

( * ) Notice: Subject to any disclaimer, the term of this patent is extended or adjusted under 35 U.S.C. 154(b) by 470 days.

(21) Appl. No.: 11/992,971

(22) PCT Filed: Sep. 25, 2006

(86) PCT No.: PCT/DE2006/001717
§ 371 (c)(1),
(2), (4) Date: Mar. 31, 2008

(87) PCT Pub. No.: WO2007/036219
PCT Pub. Date: Apr. 5, 2007

(65) Prior Publication Data
US 2009/0139425 A1   Jun. 4, 2009

(30) Foreign Application Priority Data
Sep. 30, 2005   (DE) .................... 20 2005 015 769 U

(51) Int. Cl.
*F16D 3/18*  (2006.01)

(52) U.S. Cl. .............................. 464/158; 464/98; 105/99
(58) Field of Classification Search .................... 464/98, 464/99, 106, 155, 156, 158, 159, 162; 105/99
See application file for complete search history.

(56) References Cited

U.S. PATENT DOCUMENTS

| 2,528,593 | A | * | 11/1950 | Hickerson, Sr. | .......... 464/106 X |
| 4,018,062 | A | * | 4/1977 | Bulliot | ........................ 464/158 |
| 4,591,349 | A | * | 5/1986 | Lenhard-Backhaus et al. | ........................ 464/162 X |

FOREIGN PATENT DOCUMENTS

| CH | 246409 | 3/1967 |
| DE | 23522268 | 4/2001 |
| DE | 10050757 | 4/2002 |
| EP | 0878368 | 11/1998 |
| GB | 1013142 | 12/1965 |

* cited by examiner

*Primary Examiner* — Greg Binda
(74) *Attorney, Agent, or Firm* — Horst M. Kasper

(57) ABSTRACT

A universal double-jointed coupling for railway vehicles with two joint levels comprises two coupling joints which are interconnected via a shaft that is surrounded by a hollow pinion shaft in order to transmit torque by means of said hollow pinion shaft. One joint level is assigned to a coupling joint encompassing a crowned gear that has angular and axial compensation capability while the other joint level is associated with a torsion-proof, flexible coupling joint.

10 Claims, 4 Drawing Sheets

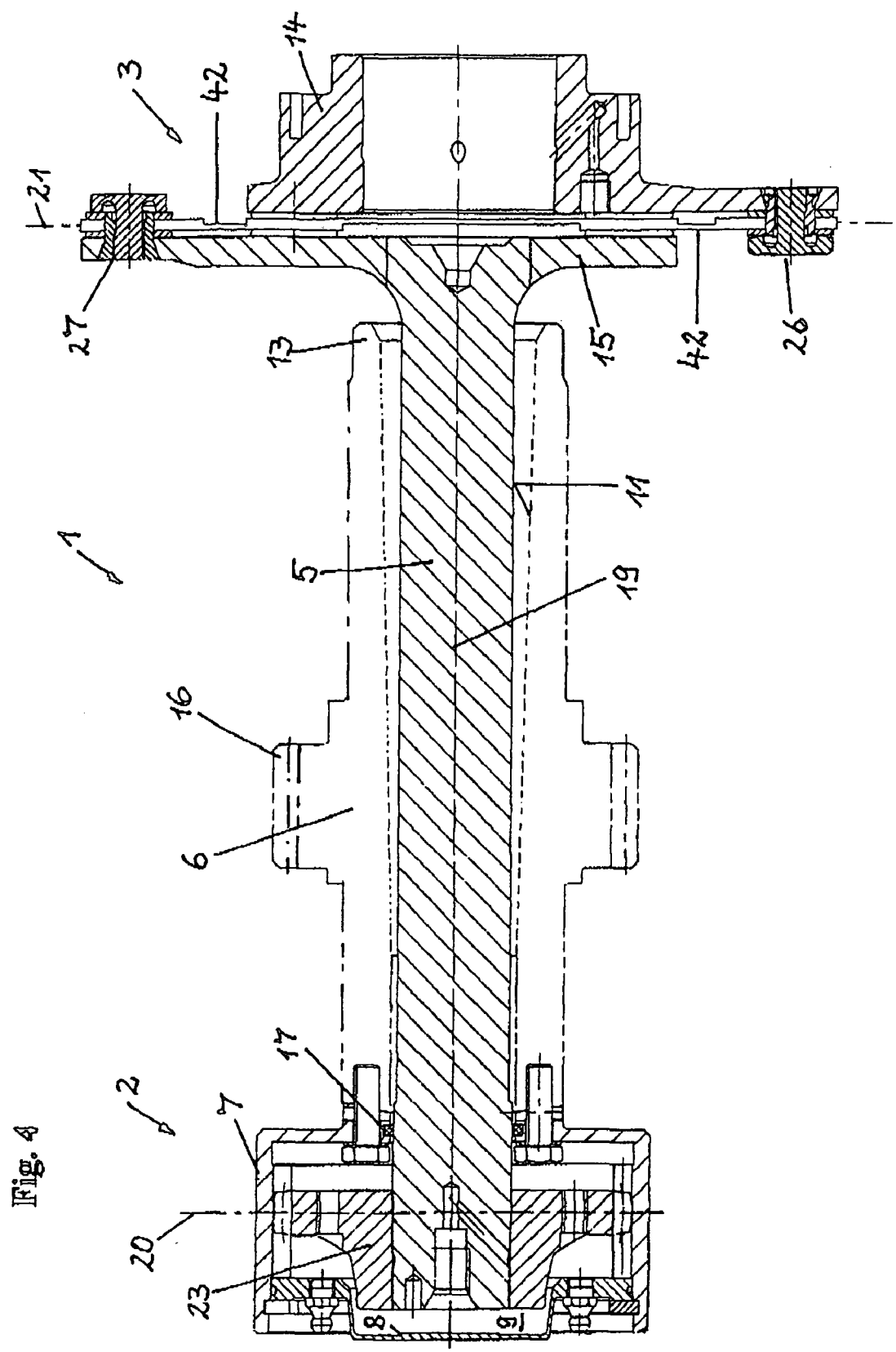

UNIVERSAL DOUBLE-JOINTED COUPLING FOR RAILWAY VEHICLES

CROSS-REFERENCE TO RELATED APPLICATIONS (not applicable)

Figure 1:
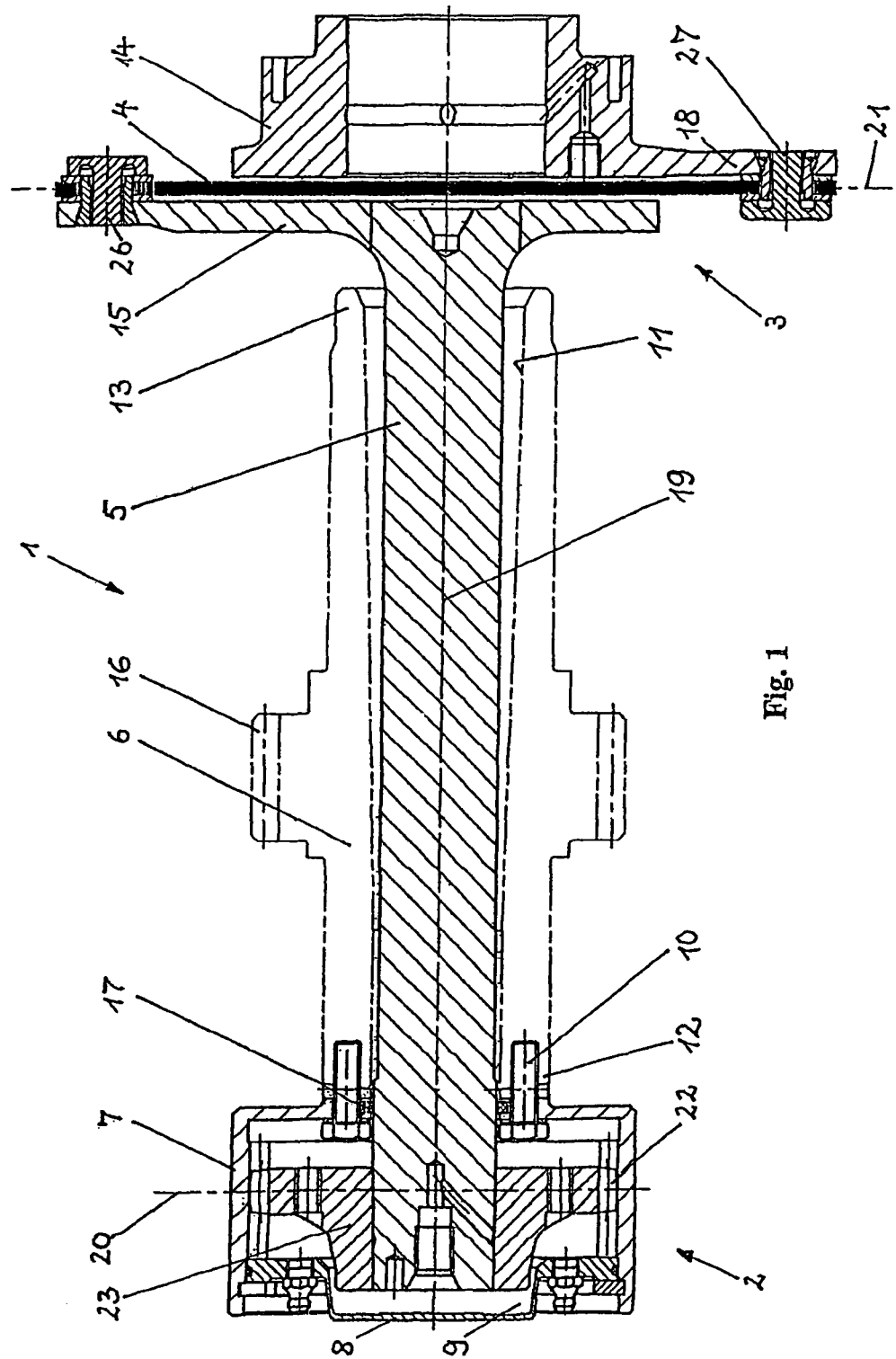

BACKGROUND OF THE INVENTION (1) Field of the Invention

A universal double-jointed coupling for railway vehicles with two joint levels comprises two coupling joints which are interconnected via a shaft that is surrounded by a hollow pinion shaft in order to transmit torque by means of said hollow pinion shaft. One joint level is assigned to a coupling joint encompassing a crowned gear that has angular and axial compensation capability while the other joint level is associated with a torsion-proof, flexible coupling joint.

(2) Description of Related Art Including Information Disclosed Under 37 CFR 1.97 and 1.98.

Conventional jaw couplings with crowned gear for transmitting torque are used for connecting a driving shaft and a driven shaft, in order to compensate the axially parallel, axial or angular shifts which arise between both shafts.

An appropriate drive unit is described in the publication EP 0878 368 AI, where one jaw coupling with crowned gear always consists of two identical joints, the problem being that the correspondingly accompanying crowned gear requires a separate lubrication and sealing. The effort for attaining a very good sealing is very high. Its high need for space is also disadvantageous. The advantage of the jaw couplings with crowned gear, however, consists in their extraordinarily good axial and angular compensation capability.

Another, improved coupling for a drive unit for railway vehicles is described in the publication DE 100 50 757 A1, with the drive unit disposing of an electric motor, which is suspended on the frame of the vehicle or on the running gear, as well as ofd a gear unit and a universal coupling system. The coupling system is located between a wheel set shaft and the gear unit, with one first portion of the coupling system in the form of a crowned jaw coupling being integrated in the drive gear of the gear unit and its lubricating oil circle, and with a second drive-end portion of the coupling system being provided between the gear unit and the wheel set. The second portion of the coupling system is a rubber elastic coupling.

One problem is that the rubber elastic portion of the coupling is susceptible to wear and therefore is not maintenance-free.

Conventional torsion-proof, flexible couplings such as all-metal couplings are couplings which compensate the shift by their elastic properties. Their advantage is also that they are durable as well as maintenance-free. But they are considerably limited in the area of the elastic forming and the shifts, meaning that the axial shifting capability is largely restricted.

A double-jointed coupling in the form of a transverse propulsion unit with a motor is described in the publication DE 295 22 268 U1. The rotor shaft of the motor lies parallel to the driving axle of a railway vehicle and is connected with an axle drive, which encloses a hollow pinion shaft enclosing a gear shaft. The gear shaft runs at least partly within the hollow pinion shaft, while the rotor shaft is coupled with its end opposite to driving side over a motor drive-off coupling with the gear shaft and the motor drive-off coupling is embodied as angularly and axially flexible coupling. The gear shaft is coupled with the hollow pinion shaft via a gear driving clutch and axially fastened by spiral springs at its ends, while the spiral springs bring the gear shaft back to its central position to the hollow pinion shaft after swinging.

One problem is that, in case of a defect, free interchangeability of the coupling elements of the coupling joint with crowned gear is not possible due to the direct linking of the gear shaft to the hollow pinion shaft over the crowned gear.

BRIEF SUMMARY OF THE INVENTION

1. Purposes of the Invention

The invention has the task to give a universal double-jointed coupling for railway vehicles which is designed in a way that an unproblematic, simple and free changeability of coupling elements in the area of the coupling joint with crowned gear can be guaranteed.

2. Brief Description of the Invention

The universal double jointed coupling for railway vehicles with two joint levels disposes of two coupling joints which are interconnected via a shaft, which is surrounded by the hollow pinion shaft for torque transmission, by a hollow pinion shaft, while one joint level is assigned to a coupling joint with crowned gear with angular and axial compensation capability and the other joint level is assigned to a torsion-proof, flexible coupling joint. The coupling joint with crowned gear shows a removable internally geared sleeve and a removable coupling hub with the corresponding external gearing, with a final area of the shaft, which is embodied as an intermediate shaft, being connected to the removable coupling hub, while the hollow pinion shaft is fastened to the outer wall of the sleeve outside the removable sleeve.

The coupling joint with crowned gear is a jaw coupling joint with crowned gear.

The torsion-proof, flexible coupling joint can be embodied as membrane coupling joint 41, washer coupling joint or strap-type coupling joint 42.

The torsion-proof, flexible coupling joint in the form of a washer coupling joint disposes of a flexible washer as main component, which is firmly connected with a first fastening element to an intermediate shaft via an intermediate shaft flange on the side which is oriented towards the jaw coupling joint with crowned gear, while, on the other side of the elastic washer, a motor hub is diametrically fastened with a second fastening element to the intermediate shaft flange with an own motor hub flange.

The hollow pinion shaft is fastened to the front side of the coupling joint with crowned gear in one end area, while the other end area of the hollow pinion shaft is open at the front side.

The intermediate shaft is surrounded by the hollow pinion shaft which is open at the front end and oriented towards the torsion-proof, flexible coupling joint.

The coupling joint with crowned gear is completely surrounded by the removable sleeve.

The sleeve disposes of a lid, which enables lubrication in a clearance between the lid and the jaw coupling hub with complete sealing.

The hollow pinion shaft can, as the need arises, show a diverging or a cylindrical inner diameter in the direction of the torsion-proof, flexible coupling joint.

The arrangement of both coupling joints in their joint levels can be embodied outside as well as inside the wheel sets in the area of the wheel sets.

It is a combination of two joints of different coupling types with different properties.

Figure 3:
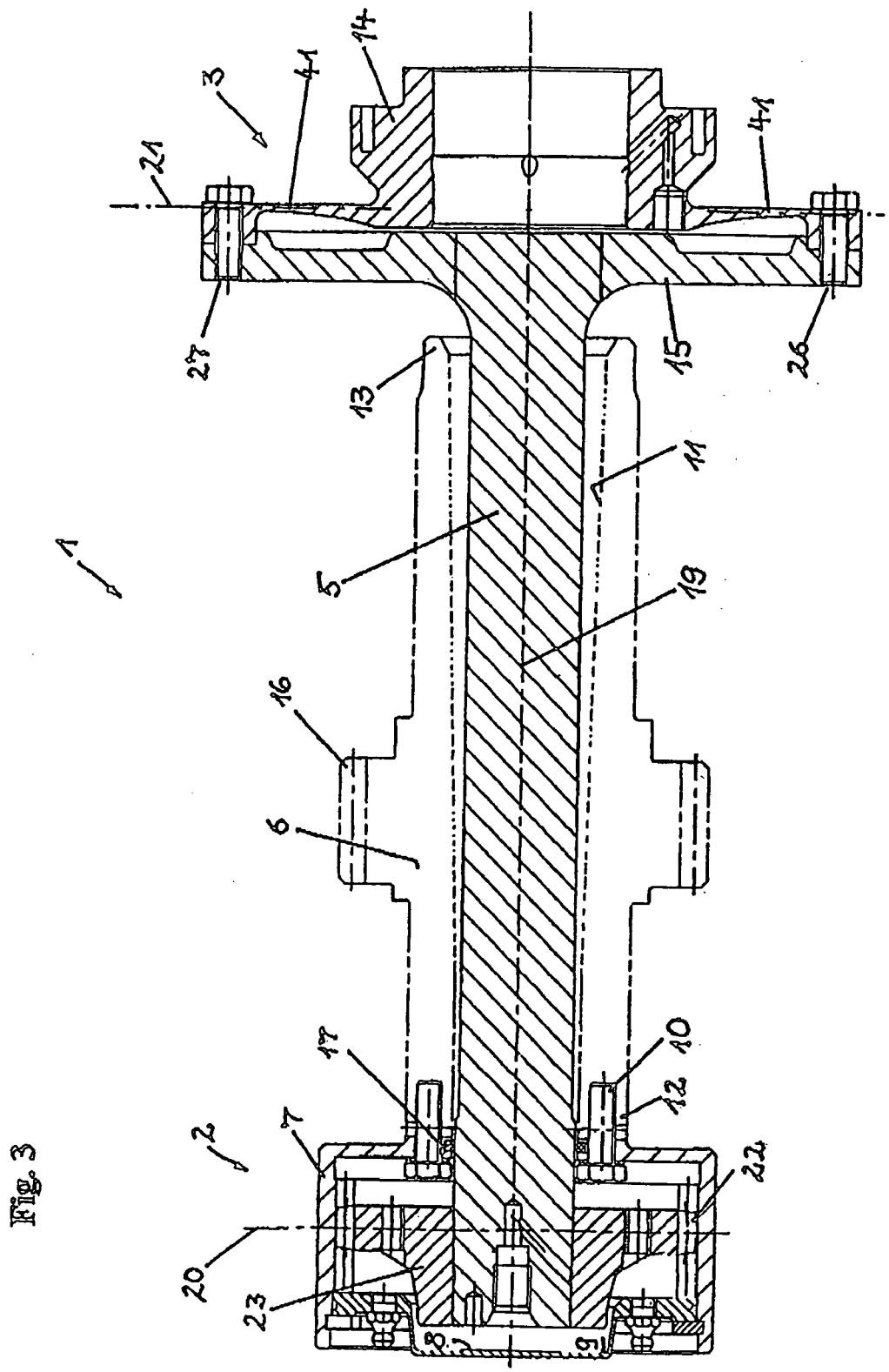

The torsion-proof, flexible coupling joint 3 is shown in FIG. 3 as a membrane coupling joint 41. Alternatively, the torsion-proof, flexible coupling joint 3 is presented in FIG. 4 as a strap type coupling joint 42.

At least the two properties—durability & freedom from maintenance as well as the little need for space—of the torsion-proof, flexible coupling joint make it possible to mount the torsion-proof, flexible coupling joints at those points in the drive unit where the surrounding is aggressive and where they have to be maintenance-free.

The properties—high axial shifting capability but nevertheless observance of lubrication and sealing—of the coupling joint with crowned gear make it possible to mount the jaw coupling joint to those points in the drive unit where the handling of the lubrication as well as the mastery of the sealing is given in a simple manner.

With the invented universal double-jointed coupling, the properties of both different joints mentioned above—durability & freedom from maintenance as well as the little need for space plus a high axial shifting capacity and lubrication at controllable points in the area of the wheel set—can be worked out and used in a targeted manner.

DETAILED DESCRIPTION OF THE INVENTION

The invention is explained in more detail with the help of application engineering and using several drawings.

Figure 2:
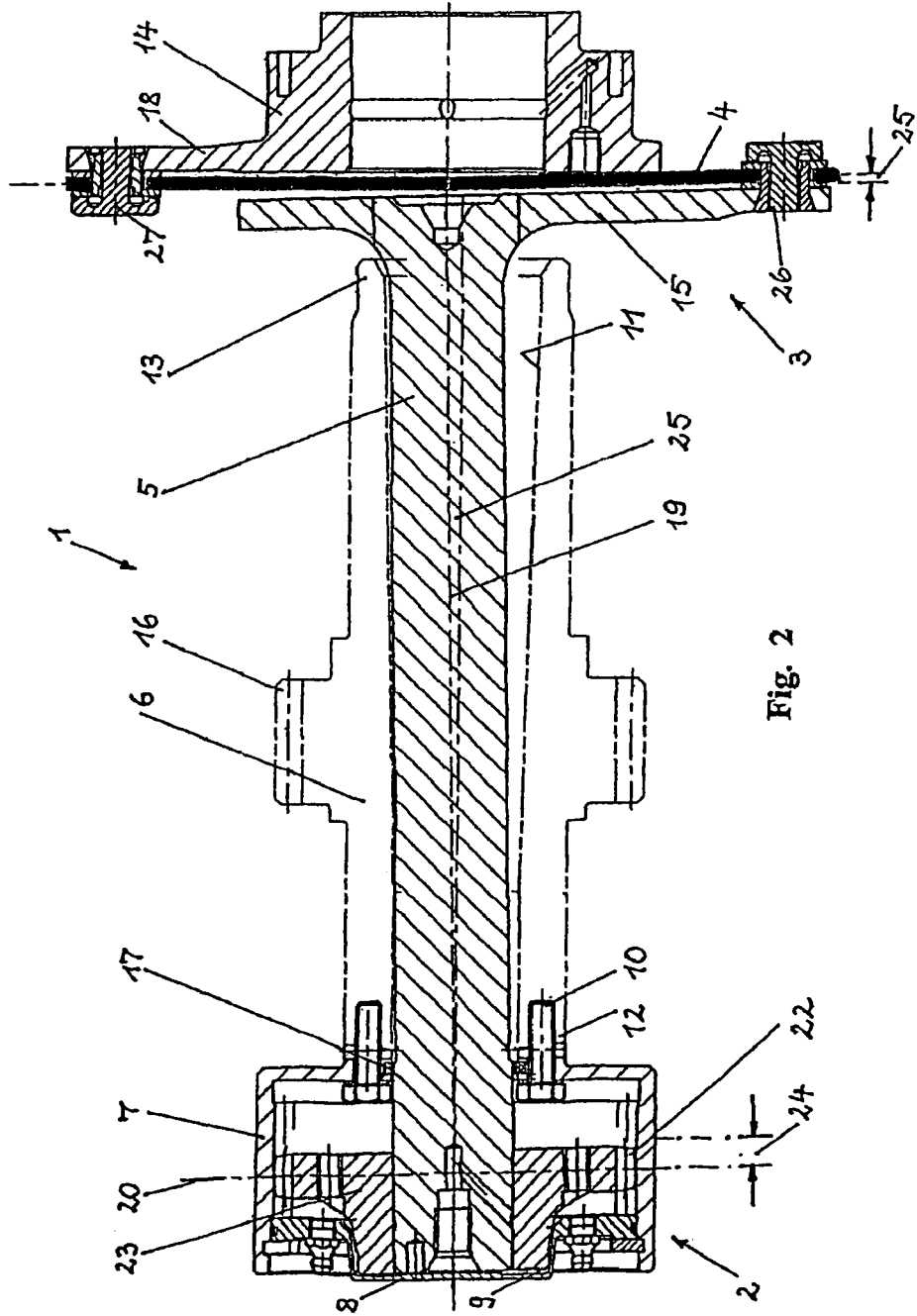

The following is shown:

FIG. 1 shows a schematic longitudinal section through an invented universal double jointed coupling joint,—jaw coupling—joint/washer coupling joint at state of rest, FIG. 2 shows a schematic longitudinal section through the double jointed coupling joint in displaced position after FIG. 1, FIG. 3 shows a schematic longitudinal section with a membrane coupling joint, and FIG. 4 shows a schematic longitudinal section with a strap-type coupling joint.

The following figures use the same reference signs for the same parts with the same functions.

FIG. 1 shows a universal double-jointed coupling 1 for railway vehicles with two joint levels 20,21, which disposes of two coupling joints, which are connected with each other for torque transmission by a hollow pinion shaft 6 via a shaft 5 which is completely surrounded by the hollow pinion shaft. One joint level 20 is assigned to a coupling joint 2 with crowned gear 22 that has angular and axial compensation capability while the other joint level 21 is assigned to a torsion-proof, flexible coupling joint 3.

As is the invention, the coupling joint 2 with crowned gear 22 disposes of a removable internally geared sleeve 7 and a removable matching externally geared coupling hub 23. A final area of the shaft 5, which is embodied as an intermediate shaft, is connected to the removable coupling hub 23 while the hollow pinion shaft 6 is fastened to the outer wall of the sleeve 7 outside the removable sleeve 7.

In FIG. 1, a washer coupling joint is used as torsion-proof, flexible coupling joint 3 and a jaw coupling with crowned gear 22 is used as coupling joint 2 with crowned gear.

Main component of the washer coupling joint 3 is a flexible washer 4, which is firmly connected using a first fastening element 26 to the intermediate shaft 5 via a flange 15 on the side which is oriented toward the jaw coupling joint 2. On the other side of the washer 4, a motor hub 14 is diametrically fastened with a second fastening element 27 to the flange 15 with a motor hub flange 18.

The jaw coupling joint 2 with the crowned gear 22 is fastened to a hollow pinion shaft 6 at the front side of an end area 12, while the other end area 13 is open on the front side and oriented towards the washer coupling joint 3.

In its middle, the hollow pinion shaft 6 disposes of a pinion 16 or of a gear wheel respectively for a connection to a gear unit (not in the drawing).

The intermediate shaft 5 is surrounded by the hollow pinion shaft 6, which is open at the front end and oriented towards the torsion-proof, flexible coupling joint 3.

The jaw coupling joint 2 with crowned gear 22 is surrounded by a sleeve 7, which disposes of a lid 8, which enables lubrication with complete sealing towards outside, while the lubrication oil or grease respectively is mainly situated in the clearance 9 between the jaw coupling hub 23 and the lid 8 or the sleeve 7 respectively. As the need arises, the sleeve 7 can be a closed sleeve.

The sleeve 7 of the jaw coupling joint 2 with crowned gear is fastened to the hollow pinion shaft 6 with a screwing 10.

In the end area 12 between the hollow pinion shaft 6 and the sleeve 7 there is an inner sealing 17.

The hollow pinion shaft 6 has a diverging inner diameter 11 in the direction of the torsion-proof, flexible coupling joint 3.

The arrangement of both coupling joints 2,3 can be embodied arbitrarily in its joints 20,21 in the area of drive units or wheel sets respectively.

The torsion-proof, flexible coupling joint 3 can also be embodied as membrane coupling joint 41 or strap type coupling joint 42. The torsion-proof, flexible coupling joint 3 is illustrated in FIG. 3 as a membrane coupling joint 41. Alternatively, the torsion-proof, flexible coupling joint 3 is represented in FIG. 4 as a strap type coupling joint 42.

In the following, the mode of operation of the invented double-jointed coupling 1 is explained in more detail using FIG. 2:

In FIG. 2, the universal double-jointed coupling 1 is shown in an axial shift 24 and an angular shift 25. In the axial shift 24 of the jaw coupling joint 2, the jaw coupling joint 2 is shifted together with the hollow pinion shaft 6 in the direction of the washer coupling joint 3, while the jaw coupling hub 23 uses the clearance 9 in the area of the lid 8 or the sleeve 7 respectively.

At the angular shift 25, which arises at the same time, the intermediate shaft 5 tilts out of the coupling axis 19 which means that the flexible washer 4 absorbs the angular shift 25.

For illustrating this, the dynamic deviations of the joint levels 20,21 in FIG. 2 are shown in relation to the state of rest in FIG. 1.

With the invented universal double-jointed coupling 1, the advantages of both different coupling joints 2,3—durability & freedom from maintenance as well as the little need for space plus a high axial shifting capacity and lubrication at controllable points in the area of the wheel set—can be worked out and used in a targeted manner.

In case of an independent drive for a tram for example, which is situated outside, the torsion-proof, flexible coupling joint 3 can be situated at points between the wheel and the gear unit, where there is little space, and directly above the street, where the surrounding is aggressive.

Due to the given freedom from maintenance, this arrangement of the torsion-free, flexible coupling joint 3 in this surrounding is very useful.

However, the jaw coupling joint 2 with crowned gear 22 can be situated in the protected area of the gear unit, where there is enough space for adjusting and shifting. There, the jaw coupling joint 2 with crowned gear 22 can be sealed by the lid 8 or the sleeve 7 respectively, which is not moved and thus guarantees sealing towards outside.

This invention presents the possibility that an unproblematic, simple and free changeability of coupling elements in the area of the coupling joint with crowned gear can be guaranteed.

In FIG. 1, the jaw coupling joint 2 with the crowned gear 22 can be firmly fastened to the gear unit via the hollow pinion shaft 6, while the connection of the sleeve 7 with the hollow pinion shaft 6 and the lid 8, which is adapted to the sleeve, presents the possibility that towards outside there are no moving sealing elements which negatively influence the sealing. The jaw coupling joint 2 with crowned gear is completely closed outwardly.

Thus, the normally high maintenance requirements for sealing the jaw coupling joint 2 with crowned gear 22 are considerably reduced.

The invented universal double-jointed coupling 1 presents the possibility to adjust drive units for railway vehicles to the environmental and technical circumstances more comprehensively and more flexibly.

REFERENCE SIGN LIST

1 Double-jointed coupling
2 Coupling joint with crowned gear
3 Torsion-proof, flexible coupling joint
4 Washer
5 Intermediate shaft
6 Hollow pinion shaft
7 Sleeve
8 Lid
9 Clearance
10 Screwing
11 Inner diameter
12 First end area
13 Second end area
14 Motor hub
15 Flange
16 Pinion
17 Inner sealing
18 Motor hub flange
19 Coupling axis
20 First joint level
21 Second joint level
22 Crowned gear
23 Jaw coupling hub
24 Axial shift
25 Angular shift
26 First fastening element
27 Second fastening element

The invention claimed is:

1. Universal double-jointed coupling (1) for railway vehicles with two joint levels (20,21), which disposes of two coupling joints, which are connected with each other via a shaft, which is surrounded by a hollow pinion shaft (6) for torque transmission by the hollow pinion shaft (6), while
   one joint level (20) being assigned to a coupling joint (2) with crowned gear (22) with angular and axial compensation capability and
   the other joint level (21) being assigned to a torsion-proof, flexible coupling joint (3), characterized by the fact that
   the coupling joint (2) with crowned gear (22) shows a removable internally geared sleeve (7) and a removable coupling hub (23) with the corresponding external gearing, while the final area of the shaft (5), which is embodied as an intermediate shaft, is connected to the removable coupling hub (23) and
   the hollow pinion shaft (6), is fastened to the outer wall of the sleeve (7) outside the removable sleeve (7).

2. Double-jointed coupling according to claim 1, characterized by the fact that the coupling joint (2) with crowned gear (22) is a jaw coupling joint with crowned gear.

3. Double-jointed coupling according to claim 1, characterized by the fact that the torsion-proof, flexible coupling joint (3) is embodied as membrane coupling joint (41), washer coupling joint or strap type coupling joint (42).

4. Double-jointed coupling according to claim 3, characterized by the fact that the torsion-proof, flexible coupling joint (3) in the form of a washer coupling joint disposes of a flexible washer (4) as main component, which is firmly connected with a first fastening element (26) to an intermediate shaft (5) via an intermediate shaft flange (15) on the side which is oriented towards the jaw coupling joint (2) with crowned gear (22), while, on the other side of the elastic washer (4), a motor hub (14) is diametrically fastened with a second fastening element (27) to the intermediate shaft flange (15) with an own motor hub flange (18).

5. Double-jointed coupling according to claim 1, characterized by the fact that, on the coupling joint (2) with crowned gear (22), the hollow pinion shaft (6) is fastened to the front end of one end area (12), while the other end area (13) of the hollow pinion shaft (12) is open at the front end.

6. Double-jointed coupling according to claim 5, characterized by the fact that the intermediate shaft (5) is surrounded by the hollow pinion shaft (6), which is open at the front end and oriented towards the torsion-proof, flexible coupling joint (3).

7. Double-jointed coupling according to claim 1, characterized by the fact that the coupling joint (2) with crowned gear (22) is completely surrounded by the removable sleeve (7).

8. Double-jointed coupling according to claim 7, characterized by the fact that the sleeve (7) disposes of a lid (8), which enables lubrication in a clearance (9) between the lid (8) and the jaw coupling hub (23) with complete sealing.

9. Double-jointed coupling according to claim 1, characterized by the fact that the hollow pinion shaft (6) shows, as the need arises, a diverging or a cylindrical inner diameter (11) in the direction of the torsion-proof, flexible coupling joint (3).

10. Double-jointed coupling according to claim 1, characterized by the fact that the arrangement of both coupling joints (2,3) in their joint levels (20,21) can be embodied outside as well as inside wheel sets in the area of the wheel sets.

* * * * *